(12) United States Patent
Krueger et al.

(10) Patent No.: US 11,908,165 B2
(45) Date of Patent: *Feb. 20, 2024

(54) SYSTEMS AND METHODS FOR CALIBRATING IMAGE CAPTURING MODELS

(71) Applicant: BNSF Railway Company, Fort Worth, TX (US)

(72) Inventors: Darrell R. Krueger, Lawrence, KS (US); Garrett Smitley, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/535,153

(22) Filed: Nov. 24, 2021

(65) Prior Publication Data

US 2022/0084248 A1    Mar. 17, 2022

Related U.S. Application Data

(63) Continuation of application No. 16/816,525, filed on Mar. 12, 2020, now Pat. No. 11,270,466.

(51) Int. Cl.
*G06T 7/80* (2017.01)
*G06T 7/00* (2017.01)
*G01C 25/00* (2006.01)

(52) U.S. Cl.
CPC .............. *G06T 7/80* (2017.01); *G01C 25/00* (2013.01); *G06T 7/97* (2017.01); *G06T 2207/30252* (2013.01)

(58) Field of Classification Search
CPC ... G06T 7/80; G06T 7/97; G06T 2207/30252; G01C 25/00
See application file for complete search history.

(56) References Cited

U.S. PATENT DOCUMENTS

| 6,950,212 B1 | 9/2005 | Weidlich |
| 2005/0002558 A1* | 1/2005 | Franke ...................... B60R 1/00 382/154 |

(Continued)

FOREIGN PATENT DOCUMENTS

| CN | 106023213 A | 10/2016 |
| CN | 108765494 A | 11/2018 |

(Continued)

OTHER PUBLICATIONS

Patent Cooperation Treaty, International Search Report and Written Opinion, International Application No. PCT/2021/019503, dated May 7, 2021 22 pages.

*Primary Examiner* — Ming Y Hon
(74) *Attorney, Agent, or Firm* — Whitaker Chalk Swindle & Schwartz, PLLC; Enrique Sanchez, Jr.; Bradley J. Birchfield

(57) ABSTRACT

In one embodiment, a method includes capturing, by a camera of an image capturing module, a first image of a target. The image capturing module and a drum are attached to a fixture and the target is attached to the drum. The method also includes determining a number of lateral pixels in a lateral pitch distance of the image of the target, determining a lateral object pixel size based on the number of lateral pixels, and determining a drum encoder rate based on the lateral object pixel size. The drum encoder rate is programmed into a drum encoder. The method further includes capturing, by the camera, a second image of the target while the target is rotated about an axis of the drum, determining a number of longitudinal pixels in a longitudinal pitch distance of the second image, and comparing the number of lateral pixels to the number of longitudinal pixels.

23 Claims, 6 Drawing Sheets

(56) References Cited

U.S. PATENT DOCUMENTS

| | | | | |
|---|---|---|---|---|
| 2015/0254853 A1* | 9/2015 | Tanaka | ...................... | G06T 7/80 |
| | | | | 348/148 |
| 2017/0061623 A1* | 3/2017 | Jaehnisch | ................. | G06T 7/80 |
| 2017/0221188 A1* | 8/2017 | Aoki | ....................... | G06T 5/003 |
| 2020/0068186 A1* | 2/2020 | Aoki | ....................... | G06T 5/006 |

FOREIGN PATENT DOCUMENTS

| | | | |
|---|---|---|---|
| JP | 2019190889 | A | 10/2019 |
| WO | 2019023613 | A1 | 1/2019 |
| WO | 2019023658 | A1 | 1/2019 |

* cited by examiner

SYSTEMS AND METHODS FOR CALIBRATING IMAGE CAPTURING MODELS

TECHNICAL FIELD

This disclosure generally relates t(image capturing modules, at more specifically to systems and methods for calibrating image capturing modules.

BACKGROUND

Certain vehicles use cameras to capture images of objects in the environment surrounding the vehicle. These images may be used to identify and/or locate objects within the surrounding environment. However, images captured from a vehicle while the vehicle is in motion may be blurry or distorted, which can result in an inaccurate identification and/or location of the objects.

SUMMARY

According to an embodiment, a method includes capturing, by a camera of an image capturing module, a first image of a target. The image capturing module and a drum are attached to a fixture and the target is attached to the drum. The method also includes determining a number of lateral pixels in a lateral pitch distance of the image of the target, determining a lateral object pixel size, based on the number of lateral pixels, and determining a drum encoder rate based on the lateral object pixel size. The drum encoder rate is programmed into a drum encoder attached to the drum. The method further includes capturing, by the camera of the image capturing module, a second image of the target while the target is rotated about an axis of the drum, determining a number of longitudinal pixels in one longitudinal pitch distance of the second image, and comparing the number of lateral pixels to the number of longitudinal pixels.

In certain embodiments, the drum encoder rate is a number of electrical pulses generated by the drum encoder in one revolution of a shall of the drum encoder. In some embodiments, the drum encoder rate is calculated using a circumference of the drum and the lateral object pixel size. The target may be a checkerboard pattern comprising a plurality of black and white squares, the lateral pitch distance may represent a width of one square of the plurality of squares, and the longitudinal pitch distance may represent a length of the one square of the plurality of squares.

In certain embodiments., the method includes determining, in response to comparing the number of leteral pixels to the number of longitudinal pixels, that the number of lateral pixels matches the number of longitudinal pixels and calculating a vehicle encoder rate based on the drum encoder rate. In some embodiments, the method further includes programming the vehicle encoder rate into a vehicle encoder attached to a wheel of a vehicle and capturing, by the camera of the image capturing module, images of a second target. The image capturing module is attached to the vehicle and the second target is attached to a roadway.

In certain embodiments, the method includes determining, in response to comparing the number of lateral pixels to the number of longitudinal pixels, that the number of lateral pixels is different from the number of longitudinal pixels, adjusting the drum encoder rate to an adjusted drum encoder rate, and programming the adjusted drum encoder rate into the drum encoder. The method further includes capturing, by the camera of the image capturing module, a third image of the target while the target is rotated about an axis of the drum, determining a number of longitudinal pixels in one longitudinal pitch distance of the third image, and comparing the number of lateral pixels to the number of longitudinal pixels in the one longitudinal pitch distance of the third image. In some embodiments, the method includes focusing, the camera of the image capturing module on the target under constant lighting conditions and obtaining a maximum contrast between two pixels that identify a boundary of light and dark portions of the target.

According to another embodiment, a system includes a fixture, a drum attached to the fixture, a target attached to the drum, a drum encoder attached to the drum, and an image capturing module attached to the fixture. The image capturing module includes a camera that capture a first image of the target and captures a second image of the target while the target is rotated about an axis of the drain. The system further includes one or more controllers communicatively coupled to the drum encoder and the camera. The one or more controllers determine a number of lateral pixels in a lateral pitch distance of the image of the target, determine a lateral object: pixel size based on the number of lateral pixels, and determine a drum encoder rate based on the lateral object pixel size, wherein the drum encoder rate is programmed into a drum encoder attached to the drum. The one or more controllers further determine a number of longitudinal pixels in one longitudinal pitch distance of the second image and compare the number of lateral pixels to the number of longitudinal pixels.

According to yet another embodiment, one or more computer-readable storage media embody instructions that, when executed by a processor, cause the processor to perform operations including capturing, by a camera of an image capturing module, a first image of a target. The image capturing module and a drum are attached to a fixture and the target is attached to the drum. The operations also include determining a number of lateral pixels in a lateral pitch distance of the image of the target, determining a lateral object pixel size based on the number of lateral pixels, and determining a drum encoder rate based on the lateral object pixel size, wherein the drum encoder rate is programmed into a drum encoder attached to the drum. The operations further include capturing, by the camera of the image capturing module, a second image of the target while the target is rotated about an axis of the drum, determining a number of longitudinal pixels in one longitudinal pitch distance of the second image, and comparing the number of lateral pixels to the number of longitudinal pixels.

Technical advantages of certain embodiments of this disclosure may include one or more of the following This disclosure describes systems and methods for bench calibrating an image capturing module, which may reduce the time and/or personnel required to field calibrate the image capturing module. Certain embodiments of this disclosure use a rotating drum located in a laboratory to simulate a moving roadway, which allows an operator (e.g., a computer programmer) to test the calibration system at full speed with a live image. As such, the systems and methods described herein for bench calibrating an image capturing module may improve the safety and efficiency of field calibration since the time the personnel spends calibrating the image capturing module in the field under dangerous conditions (e.g., working on a roadway and under heavy equipment) is reduced, the number of field personnel is reduced, and the cost of expensive field testing is minimized. The systems and methods described in this disclosure may be generalized to different transportation in including railways, roads, and waterways.

Other technical advantages will be readily apparent to one skilled in the art from the following figures, descriptions, and claims. Moreover, while specific advantages have been enumerated above, various embodiments may include all, sonic, or none of the enumerated advantages,

BRIEF DESCRIPTION OF THE DRAWINGS

To assist in understanding the present disclosure, reference is now made to the following description taken in conjunction with the accompanying drawings, in which.

DETAILED DESCRIPTION

Certain vehicles include image capturing systems that capture images while the vehicle is in motion, These images may be used by machine vision models to detect and/or locate objects in the environment surrounding the vehicle. Embodiments of this disclosure describe systems and methods for calibrating the image capturing modules and/or rotary encoders used by these systems. These calibration procedures may ensure that the image capturing modules and rotary encoders used in these systems are in synchronization and deliver sharp, high contrast, and properly proportioned images.

Figure 1:
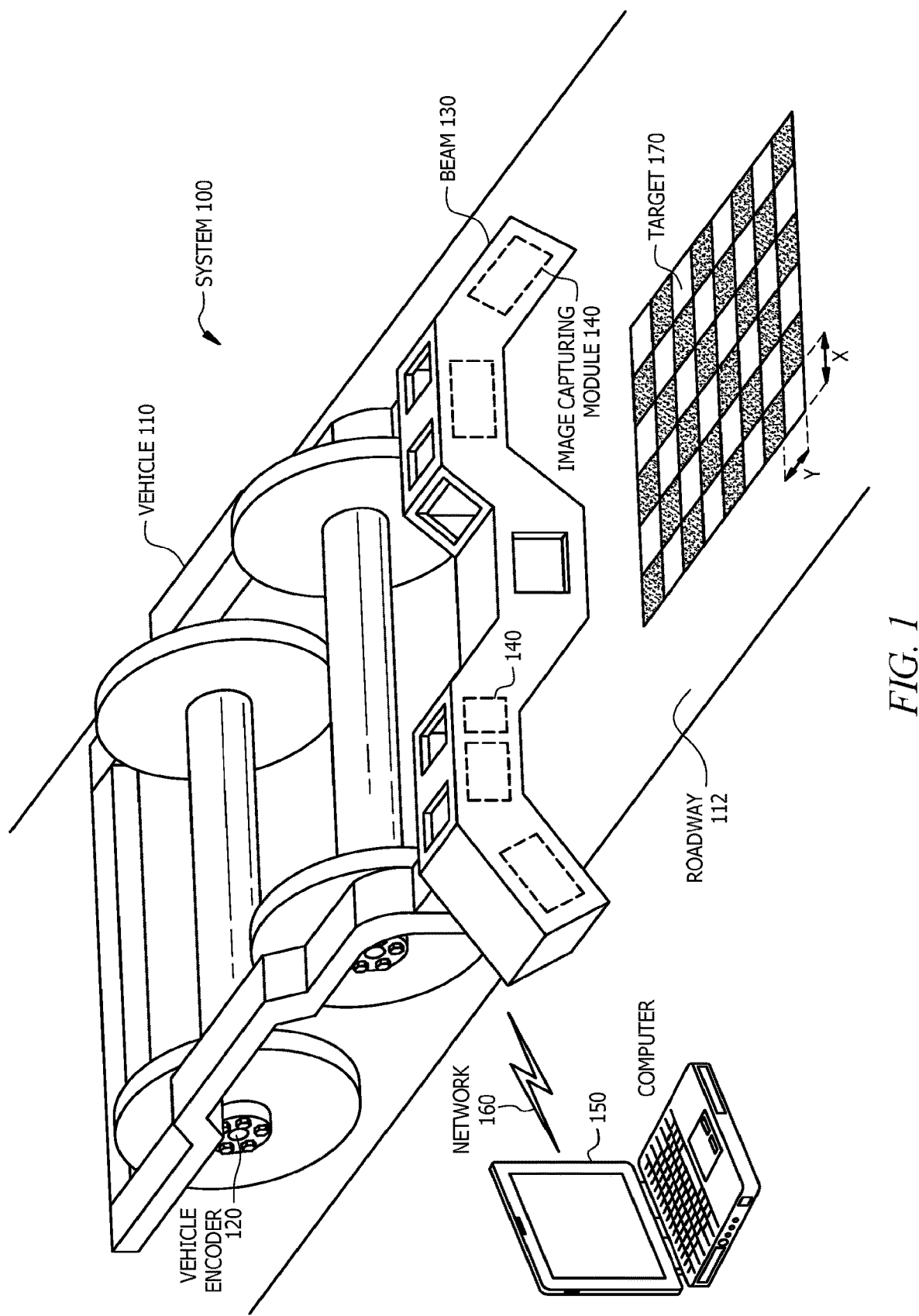
FIG. 1 illustrates an example system for field calibrating an image capturing module and a vehicle encoder.
Figure 2:
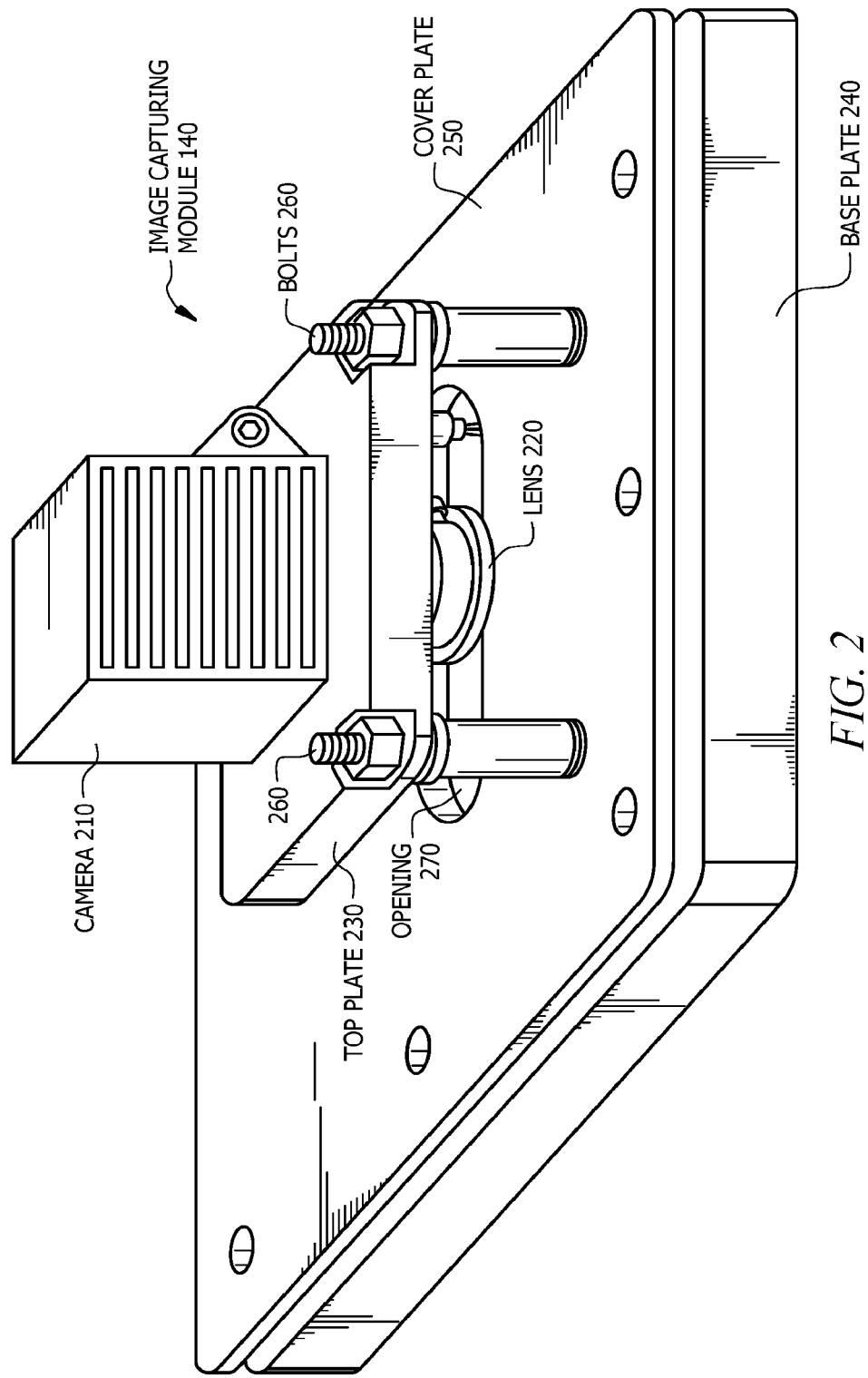
FIG. 2 illustrates an example image capturing module that may be used by the system of FIG. 1.
Figure 3:
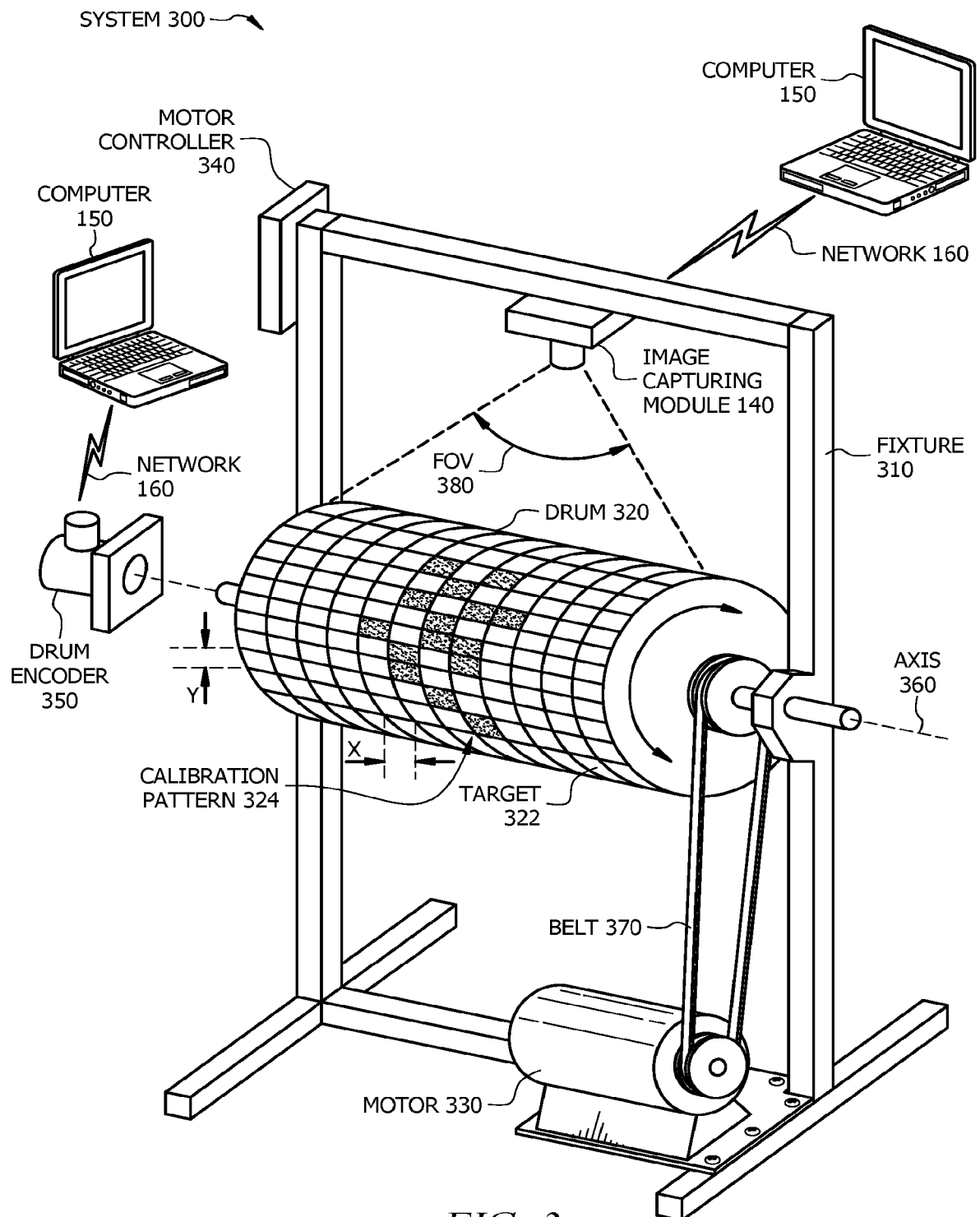
FIG. 3 illustrates an example system for bench calibrating an image capturing module.
Figure 4:
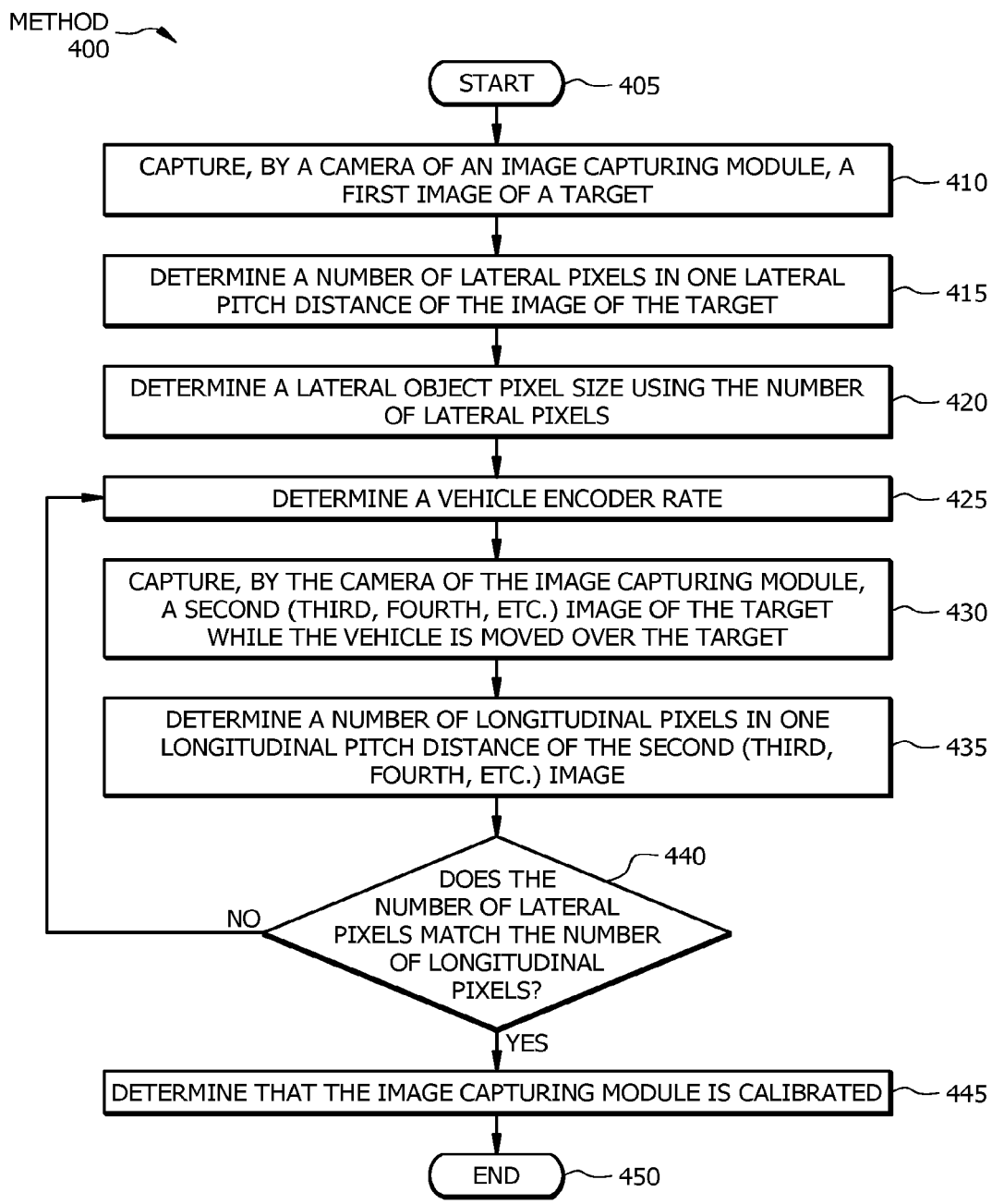
FIG. 4 illustrates an example method for field calibrating an image capturing module.
Figure 5:
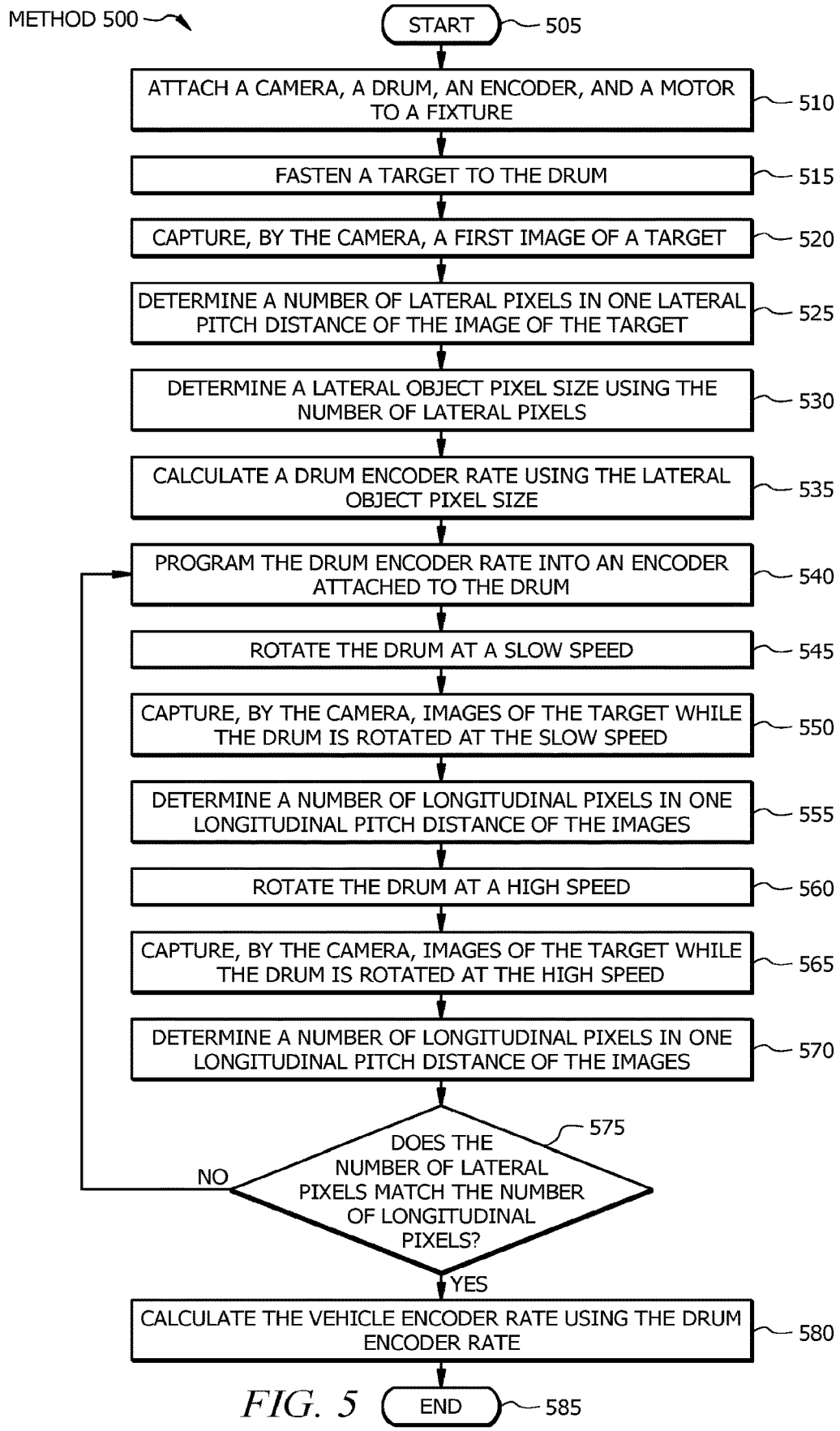
FIG. 5 illustrates an example method for bench calibrating an image capturing module.
Figure 6:
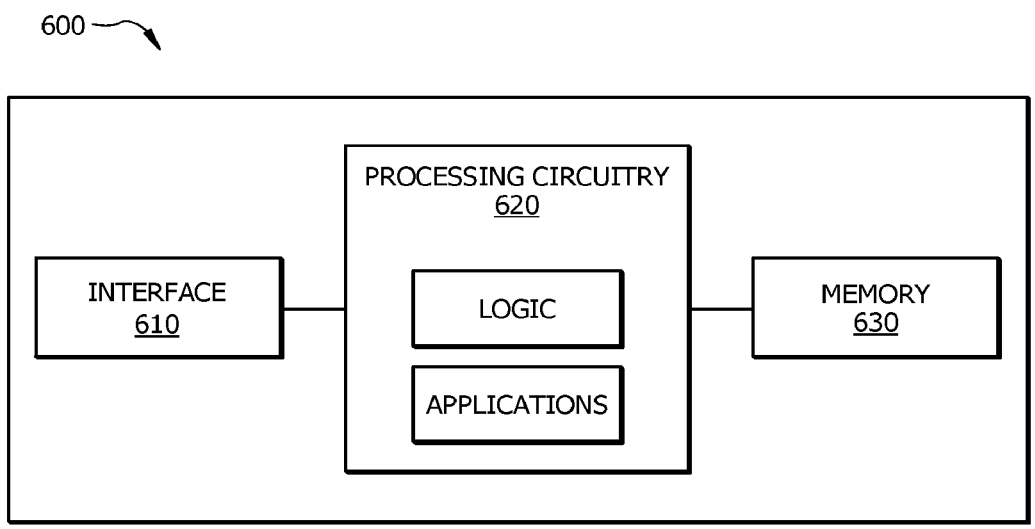
FIG. 6 illustrates an example computer system that may be used by the systems and methods described herein.

FIGS. 1 through 6 show example systems and methods for calibrating an image capturing module. FIG. 1 shows an example system for field calibrating an image capturing module, and FIG. 2 shows an example image capturing module that may be used by the system of FIG. 1. FIG. 3 shows an example system for bench calibrating an image capturing module. FIG. 4 shows in example method for field calibrating an image capturing module, and FIG. 5 shows an example method for bench calibrating an image capturing module and a drum encoder. FIG. 6 shows an example computer system that may be used by the systems and methods described herein.

FIG. 1 illustrates an example system 100 for field calibrating an image capturing module 140, System 100 or portions thereof may be associated with an entity, which may include any entity, such as a business, company (e,g., a railway company, a transportation company, etc.), or a government agency (e.g., a department of transportation, a department of public safety, etc.) that field calibrates image capturing module 140. The elements of system 100 may be implemented using any suitable combination of hardware, firmware, and software. For example, the elements of system 100 may be implemented using one or more components of the computer system of FIG. 6.

System 100 includes a vehicle 110, a vehicle encoder 120, a beam 130., one or more image capturing modules 140, a computer 150, a network 160, and a target 170 Vehicle 110 of system 100 is any machine capable of automated movement. Vehicle 110 may be a car, a locomotive, a truck, a bus, an aircraft, or any other machine suitable for mobility. Vehicle 110 may operate at any speed that allows one or more components (e.g., sensors, cameras, etc.) of beam 130 to capture images, For example, vehicle 110 may be a rail bound vehicle that travels at 65 miles per hour (mph). Roadway 112 of system 100 is any path that accommodates vehicle 110 For example, vehicle 110 may travel along roadway 112. Roadway 112 may include a road, a highway, a railroad track, a water way, and the like, Vehicle encoder 120 of system 100 is a rotary encoder or other timing device used to measure axle rotation. Vehicle encoder 120 may measure the number of times an axle makes a revolution. Vehicle encoder 120 may be attached to an axle of vehicle 110. Vehicle encoder 120 may be physically and/or logically connected to one or more components of system 100. For example, vehicle encoder 120 may be physically and/or logically connected to one or more cameras and/or sensors of image capturing module 140. As another example, vehicle encoder 120 may be physically and/or logically connected to computer 150.

Vehicle encoder 120 may communicate with a camera of image capturing module 140 via a controller to ensure that the camera captures images of the same perspective and proportion regardless of the speed of travel of vehicle 110. For example, vehicle encoder 120 may be synchronized with multiple cameras of image capturing modules 140 to ensure that all cameras are taking images at the same time. As another example, vehicle encoder 120 may be synchronized with a cam era. of image capturing module 140 to ensure that a camera traveling with vehicle 110 at a first speed (e.g., 10 miles per hour) captures images that are the same perspective and proportion of a camera traveling with vehicle 110 at a second speed. (e.g., 65 miles per hour).

Beam 130 of system 100 is a structure that contains and orients components (e.g., image capturing modules 140) used to capture images. In certain embodiments, beam 130 operates similar to a flatbed document scanner with the exception that beam 130 is in motion while capturing images of stationary physical objects. Beam 130 engages with vehicle 110. For example, beam 130 may be bolted to a sub-frame attached to vehicle 110. in the illustrated embodiment of FIG. 1, beam 130 has three sections that include two end sections and a center section. Beam 130 has a gullwing configuration such that the center section bends inward toward the center of beam 130. The gullwing configuration allows the image capturing components (e.g., sensors, cameras, etc.) of image capturing modules 140 within beam 130 to be properly oriented within with respect to the physical objects being captured. In certain embodiments, the center section of beam 130 is omitted, and each end section is connected to vehicle 110. Beam 130 may be made of metal (e.g., steel or aluminum), plastic, or any other material suitable for housing components of beam 130 and for attaching beam 130 to vehicle 110.

Beam 130 ma include one or more openings. Openings may provide for the placement of image capturing modules 140 within beam 130. Openings may allow for installation, adjustment, and maintenance of image capturing modules 140. While beam 130 is illustrated in FIG. 1 as having a particular size and shape, beam 130 may have any size and shape suitable to house and orient image capturing modules 140. Other factors that may contribute to the design of beam 130 include shock resistance, vibration resistance, weatherproofing considerations, durability, ease of maintenance, calibration considerations, and ease of installation.

Image capturing modules 140 of system 100 are used to capture images while vehicle 110 is in motion Each image capturing module 140 may include one or more sensors, one or more, cameras, and the like. One or more image capturing modules 140 may be attached to vehicle 110 at any location that allows image capturing modules 140 to capture images of the environment surrounding vehicle 110 In the illustrated embodiment of FIG. 1, image capturing modules 140 are located within beam 130.

In certain embodiments, each end section of beam 130 houses one or more image capturing modules 140. For example, a first end section of beam 130 may house image capturing, modules 140 that include two downward facing cameras that capture images of tie and ballast areas of a rail. The first end section of beam 130 may house the two downward facing cameras in a portion of the first end section that is substantially horizontal to the rail. The second end section of beam 130 opposite the first end section may house two image capturing modules 140 that each include two angled cameras that capture images of both sides of the rail and rail fastening system. The second end section of beam 130 may house the four angled cameras in portions of the second end section that are at an angle (e.g a 45 degree angle) to the rail, Image capturing modules 140 may include various types of sensors depending on sensing and/or measuring requirements, Sensors housed by image capturing modules 140 may include optical sensors (e.g. cameras for visible light (mono and color), infrared, UltraViolet, and/or thermal), motion sensors (e.g., gyroscopes and accelerometers), light detection and ranging (LIDAR) sensors, hyperspectral sensors, Global Positioning System (GPS) sensors, and the like. Optical sensors and lasers may be used together for laser triangulation to measure deflection or profile. LIDAR sensors may be used for generating three-dimensional (3D) point-cloud data. Hyperspectral sensors may be used for specific wavelength responses. An example image capturing module 140 is described in FIG. 2 below.

Computer ISO of system 100 represents any suitable computing component that may be used to process information for system 100. Computer ISO may coordinate one or more components of system 100. Computer 150 may receive data from image capturing modules 140 and/or vehicle encoder 120. Computer 150 may monitor inputs and/or outputs of image capturing modules 140 and/or vehicle encoder 120 Computer 150 may include a communications function that allows users (e.g., a technician) to engage system 100 directly. For example, a user may access computer 150 through an interface (e.g., a screen, a graphical user interface (GUI) or a panel) of computer 150 Computer 150 may be a laptop computer, a desktop computer, a smartphone, a tablet, a personal digital assistant, a wearable computer, and the like. Computer 150 may be located inside or external to vehicle 110, Computer 150 may communicate with one or more components of system 100 via network 160.

Network 160 of system 100 is any type of network that facilitates communication between components of system 100. One or more portions of network 160 may include an ad-hoc network, an intranet, an extranet, a virtual private network (VPN), a local area network (LAN), a wireless LAN (WL AN), a wide area network (WAN), a wireless WAN (WWAN), a metropolitan area network (MAN), a portion of the Internet, a portion of the Public Switched Telephone Network (PSTN), a. cellular telephone network, a 3G network, a 4G network, a 5G network, a Long Term Evolution (LTE) cellular network, a combination of two or more of these, or other suitable types of networks. One or more portions of network 100 may include one or more access (e.g., mobile access), core, and/or edge networks. Network 160 may be any communications network, such as a private network, a public network, a connection through Internet, a mobile network, a WI-FI network, a Bluetooth network, etc. One or more components of system 100 may communicate over network 160. For example, computer 150 may communicate over network 160, including receiving information from image capturing modules 140 and/or vehicle encoder 120.

Target 170 of system 100 is an object used to calibrate image capturing module 140 and/or vehicle encoder 120. In certain embodiments, target 170 is placed in clear view of image capturing module 140. For example, target 170 may be secured to roadway 112 (e.g., railroad tracks) in clear view of the camera of image capturing module 140. Target 170 includes a calibration pattern. The calibration pattern may be any suitable size, shape, and/or design The calibration pattern design may include a checkerboard pattern, a chessboard pattern, a circle grid pattern, a ChArUcoboard pattern, and the like For example, the calibration pattern may be a printed black-and-white checkerboard pattern that includes multiple black and white squares. The calibration pattern may have a pitch between 0.375 inch and 2.0 inches (e.g., 0.5 inch, 1.0 inch, etc.). The pitch represents the length width of one square of the checkerboard pattern. In certain embodiments, the calibration pattern may include units with an unequal length to width ratio. For example, the length of each unit may be twice as long as the width of each unit.

In operation, a vehicle encoder rate is programmed into vehicle encoder 120. The vehicle encoder rate is a number of electrical pulses generated by vehicle encoder 120 in one revolution of a shaft of vehicle encoder 120. The vehicle encoder rate may be determined from calibration data previously generated during bench calibration procedures, as described in FIGS. 3 and 5 below. If bench calibration data is not available, an arbitrary value for the vehicle encoder rate may be programmed into vehicle encoder 120 In certain embodiments, the vehicle encoder rate that is programmed into vehicle encoder 1.20 is an integer. In certain embodiments, an operator programs the vehicle encoder rate into vehicle encoder 120.

Vehicle encoder 120 and image capturing module 140 of system 100 are secured to vehicle 110, Target 170 of system 100 is secured to roadway 112 in view of the camera of image capturing module 140 to be calibrated. Target 170 is located perpendicularly to the axis of the camera of linage capturing module 140. The camera of image capturing module 140 is activated, and an operator observes the current focus of the camera under constant lighting conditions. If the contrast between two pixels identifying the boundary of light and dark portions of target 170 is less than a maximum obtainable contrast (or less than observed during bench calibration procedures), the operator unlocks the focus mechanism of the camera and adjusts the focus until a maximum contrast is achieved. The focus mechanism is then locked Image capturing module 140 is connected to computer 150 via network 160 Computer 150 includes image capturing software. Image capturing module 140 captures a first image of target 170, which displayed on computer 150. The operator determines a number of lateral (e.g., cross-web) pixels in a lateral pitch distance of the first image of target 170 and determines a lateral object pixel size (OPS) by dividing the pitch of target 170 by the number of lateral pixels in the pitch region. A trial vehicle encoder rate is then determined by dividing the wheel circumference of vehicle 110 by the lateral OPS If the trial vehicle encoder rate is different than the initial vehicle encoder rate programmed into vehicle encoder 120, the trial vehicle encoder rate is programmed into the vehicle encoder 120. The image capturing software of computer 150 is triggered off of vehicle encoder 120 and vehicle 110 is moved forward or backward over target 170.

Image capturing device 140 captures second images of target 170 while vehicle 110 is moved over target 170 An operator of computer 150 determines (e.g., counts) a number of light or dark longitudinal (e.g., down vela) pixels In one longitudinal pitch distance of each of the second images and compares the number of lateral pixels to the number of longitudinal pixels. If the number of lateral pixels matches the number of longitudinal pixels, image capturing module 140 and vehicle encoder 120 are calibrated, if the number of lateral pixels is different from the number of longitudinal pixels, the vehicle encoder rate is adjusted until number of lateral pixels matches the number of longitudinal pixels As such system 100 may be used to calibrate image capturing module 140 and vehicle encoder 120 to ensure sufficient images are captured by system 100 that may be used to accurately identify objects in the environment surrounding vehicle 110.

Although FIG. 1 illustrates a particular arrangement of vehicle 110, vehicle encoder 120, beam 130, image capturing modules 140, computer 150, network 160, and target 170, this disclosure contemplates any suitable arrangement of vehicle 110, vehicle encoder 120, beam 130, image capturing modules 140, computer 150, network 160, and target 170 For example, computer 150 may be located inside vehicle 110. Vehicle 110, vehicle encoder 120, beam 130, image capturing modules 140, and computer 150 may be physically or logically co-located with each other in whole or in part.

Although FIG. 1 illustrates a particular number of vehicles 110, vehicle encoders 120, beams 130, image capturing modules 140, computers 150, networks 160, and targets 170, this disclosure contemplates any suitable number of vehicles 110, vehicle encoders 120, beams 130, image: capturing modules 140, computers 150, networks 160, and targets 170. For example, system 100 may include first beam 430 at a front end of vehicle 110 and second beam 130 at a rear end of vehicle 110, As another example, system 100 may include multiple computers 150. One or more components of system 100 may be implemented using one or more components of the computer system of FIG. 6.

FIG. 2 illustrates an example image capturing module 140 that may be used by system 100 of FIG. 1. Image capturing module 140 includes a camera 210, a lens 220, a top plate 230, a base plate 240, a cover plate 250, bolts 260, and an opening 270. Camera 210 is any device that captures images. For example, camera 210 may capture images of target 170 of FIG. 1. As another example, camera 210 may capture images of a rail component. (e.g, rail joint, a switch, a frog, a fastener, ballast, a rail head, and/or a rail tie). In certain embodiments, camera 210 includes one or more sensors.

One or more cameras 210 may capture images from different angles. For example, one or more cameras 210 may capture images of both rails of a railway system at any given location. Each beam (e.g., beam 130 of FIG 1) may include multiple cameras 210 The beam may include first camera 210 aimed straight down to capture an overhead image of a target (e.g , target 170 of FIG. 1), a physical object, etc. The beam may include second camera 210 aimed downward and outward to capture an angled image of the target, a physical object, etc.

Camera 210 may be a line scan camera A line scan camera includes a single row of pixels. Camera 210 may be a dual line scan camera A dual line scan camera includes two rows of pixels that may be captured and/or processed simultaneously. As camera 210 moves over a physical object, camera 210 may capture images such that a complete image of the physical object can be reconstructed in software line by line. Camera 210 may have a capture rate up to 140 kilohertz. Camera 210 may have a resolution and optics to detect physical objects of at least 1/16 inches in size, In certain embodiments, camera 210 includes lens 220 that focuses and directs incident light to a sensor of camera 210. Lens 220 may be a piece of glass or other transparent substance. Lens 220 may be made of any suitable material (e.g., steel, aluminum, glass, plastic, or a combination thereof.)

Top plate 230 and base plate 240 are structural elements used to position, support, and/or stabilize one or more components of image capturing module 140 (e.g , camera 210 or a sensor). Top plate 230 and bottom plate 540 may be made of any suitable material (e.g., steel, aluminum, plastic, glass, and the like). Top plate 230 may be connected to base plate 240 with one or more bolts 260. Bolts 260 (e.g , jack bolts) may be used to alter a pitch roll orientation of camera 210. For example, bolts 260 may be used to change an effective height between top plate 230 and base plate 240. Top plate 23 and/or base plate 240 may be adjusted to reduce vibration and/or shock of image capturing module 140. Top plate 230 and/or base plate 240 may include resistive heating elements to provide a warm environment for camera 210 and lens 220 to operate during cooler weather.

Cover plate 250 is a plate that covers base plate 240. Cover plate 250 may be made of any suitable material (e.g., glass, steel, aluminum, and the like). Cover plate 250 includes an opening 270, Opening 270 may serve as an aperture through which a lens of camera 210 views the physical object. Opening 270 allows for transmission of a sensed signal from the surrounding environment to reach a sensor of camera 210. Opening 270 may be any suitable size (e.g., oval, rectangular, and the like) to accommodate views of camera 210. Lens 220 of camera 210 may be positioned directly over opening 270.

Although FIG. 2 illustrates a particular arrangement of camera 210, lens 220, top plate 230, base plate 240, cover plate 250, bolts 260, and opening 270, this disclosure contemplates any suitable arrangement of camera 210 lens 220, top plate 230, base plate 240, cover plate 250, bolts 260, and opening: 270. Although FIG. 2 illustrates a particular number of cameras 210, lenses 220, top plates 230, base plates 240 cover plates 250, bolts 260, and openings 270, this disclosure contemplates any suitable number of cameras 210, lenses 220, top plates 230 base plates 240, cover plates 250, bolts 260, and openings 270. For example, image capturing module 140 may include multiple cameras 210 As another example, in certain embodiments, image capturing module 140 may not include certain components (e.g., base plate 240) illustrated in FIG. 2. One or more components of image capturing module 140 may be implemented using one or more elements of the computer system of FIG. 6.

FIG. 3 illustrates an example system 300 for bench calibrating image capturing module 140. Bench calibration includes calibration procedures where image capturing module 140 is calibrated at a bench using calibration devices to simulate the process rather than calibrating image capturing module 140 in the field using the actual process itself.

System 300 simulates a roadway (e.g., roadway 112 of FIG. 1) moving under image capturing module 140. System 300 or portions thereof may be associated with an entity, which may include any entity, such as a business, company (e.g., a railway company, a transportation company, etc.), or a government agency (e.g., a department of transportation, a department of public safety, etc.) that bench calibrates image capturing module 140. The elements of system 300 may be implemented using any suitable combination of hardware, firmware, and software. For example, the elements of system 300 may be implemented using one or more components of the computer system of FIG. 6.

System 100 of FIG. 3 includes image capturing module 140, computer 150, network 160, a fixture 310, a drum 310, a motor 330, a motor controller 340, and a drum encoder 350. Fixture 310 of system 300 is any structure that is used to support one or more components of system 300. Fixture 310 may include one or more frames, panels, braces, fasteners (e.g , screws, bolts, etc.), and the like. One or more components of system 300 may be installed on fixture 300. In the illustrated embodiment of FIG. 3, image capturing module 140, drum 320, motor 330, motor controller 340, and drum encoder 350 are installed on fixture 310.

Image capturing module 140 is installed on fixture 310 with a fixed working distance between image capturing module 140 and target 322. This working distance is a nominal working distance and may vary slightly between different vehicles (e.g., vehicle 110 of FIG. 1) that utilize image capturing module 140. In certain embodiments, the fixed working distance between image capturing module 140 and target 322 of FIG. 3 is substantially (e.g , within five percent) equal to the fixed working distance between image capturing module 140 installed on vehicle 110 of FIG. 1. and target 170 secured to roadway 112 of 11G. 1. Image capturing module 140 may be physically and/or logically connected to one or more components of system 300. For example, image capturing module 140 may be physically and/or logically connected to drum encoder 350. As another example, image capturing module 140 may, be physically (e.g., via a wired connection) and/or logically via network 160) connected to computer 150.

Drum 320 of system 300 is an object that rotates about axis 360. Drum 320 is used to simulate a roadway (e.g, roadway 112 of FIG. 1) moving under image capturing module 140. Drum 320 may be any suitable shape or size that allows rotation about axis 360. In the illustrated embodiment of FIG. 3, drum 320 is cylindrical in shape. In certain embodiments, axis 360 passes through the center of drum 320. Drum 320 may rotate about a shaft that is located along axis 360. For example, a cylindrical shaft may be placed along the length (or a portion thereof) of the core of drum 320, and drum 320 may rotate among the shaft. Drum 320 may be any suitable material (e.g., plastic, metal, wood, fabric, a combination thereof, etc.). For example, drum 320 may be a hollow plastic cylinder with a metal cap on each end. The shall of drum 320 may pass through the center of each metal cap.

Target 322 of system 100 is an object used to calibrate camera 120 and/or drum encoder 320. Target 322 of system 300 is attached to drum 320. Target 322 is located coaxially arid in synchronization with drum encoder 350. Target 322 ma be any suitable material (e.g., paper., fabric, plastic, ink, a combination thereof, etc.). In certain embodiments, target 322 may be fastened to drum 320 using one of more fasteners (e.g., an adhesive, screws, pins, nails, etc.). For example, target 322 may be glued to an outside surface or an inside surface of drum 320. In certain embodiments, drum 322 is a hollow, clear tube, and target 322 is placed on the inside surface of the hollow, clear tube such that target 322 is visible from the exterior of drum 322. In some embodiments, target 322 is part of drum 320. For example, target 32:2 ma be printed directly on drum 320.

Target 322 includes a calibration pattern 324, Calibration pattern 324 tray be any suitable size, shape, design. Calibration pattern 324 design may include a checkerboard pattern, a chessboard pattern, a circle grid pattern, a ChArUcoboard pattern, and the like. For example, calibration pattern 324 may be a printed black-and-white checkerboard pattern with a pitch between 0.375 inch and 2.0 inches (e.g., 0.5 inch, 1 inch, etc.). The pitch represents the length/width of one square of the checkerboard pattern. In certain embodiments, calibration pattern 324 may include units with an unequal length to width ratio. For example, the length of each unit may be twice as long as the width of each unit. Calibration pattern 324 of target 322 is identical to the calibration pattern of target 170 of FIG . 1. In certain embodiments, target 322 and target 170 of FIG. 1 are the same target.

Motor 330 of system 300 is any machine that initiates the rotation of drum 320. Motor 330 may be an alternating current (AC) motor, a direct current (DC) motor, a single phase motor (e.g., 115/230 volt), a three phase motor (e.g., 230/460 volt), etc. Motor may have a revolutions-per-minute (RPM) range of 1000 to 8000 (e. g., 1700-1800). Motor 330 may be physically or logically connected to drum 320. For example, a belt 370 may be used to connect motor 330 to a rod passing through axis 360 of drum 320. Belt 370 is used to transmit drive from motor 330 to drum 320. Motor 330 may be attached to fixture 310 at any suitable location. In the illustrated embodiment of FIG. 3, motor 330 is attached to a base of fixture 310.

Motor controller 340 of system 300 controls the operation of motor 330. For example, motor controller 340 may be used to initiate the rotation of motor 330, adjust the speed of motor 330, and the like. In certain embodiments, motor controller 340 is manually operated by one or more users. Motor controller 340 may include one or more buttons, switches, displays, touch sensors, GUI), and the like that allow one or more users (e.g., operators, technicians, etc.) to input information, For example, motor controller 340 may include an on/off switch that allows a user to turn the motor on and/or off, an up/down button that allows the user to increase/decrease the speed of the motor, and the like. In some embodiments, motor controller 340 may be connected to computer 150 via network 160, which allows motor controller 340 to be operated remotely. Motor 330 and motor controller 340 drive drum 320 at a user selectable rate (e.g., 10 to 70 miles per hour). In certain embodiments drum 320 is driven in proportion to the maximum speed (e.g., 65 or 70 mph) of vehicle 110 of FIG. 1.

Drum encoder 350 of system 300 is a rotary encoder or other timing device used to measure axle rotation. Drum encoder 350 is identical (e.g., same make and model) to vehicle encoder 120 used in system 100 of FIG. 1. Drum encoder 350 may measure the number of times an axle makes a revolution. Drum encoder 350 may be physically and/or logically connected to one or more components of system 300. For example, drum encoder 350 may be physically attached to drum 320 As another example, drum encoder 350 may be physically and/or logically connected to image capturing module 140. As still another example, drum encoder 350 may be. physically (e.g., vita a wired connection) and/or logically via network 160) connected to computer 150.

In operation, a user (e.g., an operator) installs image capturing module 140 (or portions thereof such as camera 210 of FIG. 2) on fixture 310 and connects one or more components of image capturing module 140 (e.g., camera 210 of FIG. 2) to computer 150 (e.g., a computer). Computer 150 includes image capturing software The user turns (e.g., switches) on the power of image capturing module 140, The user unlocks the focus locking mechanism of image capturing module 140 and focuses a camera of image capturing module 140 on target 322 under constant: lighting conditions. A successful focus is achieved when maximum contrast is obtained between two pixels identifying the boundary of the light and dark portion of calibration pattern 324 (e.g., a checkerboard pattern) of target 322. The user then locks the focusing mechanism of image capturing module 140. From an image displayed on computer 150, the user observes a black or white region on target 322 in the middle of a field of view 380 of the camera of image capturing module 140. Field of view 380 may represent: an angle through which the camera of image capturing module 140 picks up electromagnetic radiation Field of view 380 may be limited by the area of the image displayed on computer 150. The operator of computer 150 counts the number of light or dark pixels in direction X for a lateral pitch distance of target 322 In the illustrated embodiment of FIG. 3, direction X is parallel to axis 360. A lateral object pixel size (UPS) is calculated by dividing the lateral pitch distance of target 322 by the number of pixels in the lateral pitch distance. For example, if the lateral pitch distance of target 322 equals one inch and the number of pixels for the one-inch pitch distance of target 322 is 52, the OPS equals one inch divided by 52, which equals 0.0193 inches per pixel. OPS indicates the true physical dimension represented by one pixel at the prescribed working distance (e.g., the distance between the camera of image capturing module 140 and target 322).

Measuring and calibrating the OPS ensures that the objects depicted in images captured by image capturing module 140 are properly proportioned and that no data is lost between pixels when image capturing module 140 is in field operation. In certain embodiments, the pixels are square or approximately square (e,g., having an equal length and width within a two percent tolerance). An allowance may be permitted due the limitations of the camera of image capturing module 140 and/or drum encoder 350.

An encoder rate for drum encoder 350 is determined based on the OPS. The drum encoder rate is the number of electrical pukes generated by drum encoder 350 in One revolution of the shaft of drum encoder 350. The drum encoder rate is equal to the circumference of drum 320 divided by the lateral OPS. For example, if the drum circumference is 32.9867 inches for a 10.5 inch diameter drum and the lateral OPS is 0.01923 inches, the drum encoder rate is 32.9867 inches per revolution divided by 0.01923 inches, which equals 1715.3.1 pulses (pixels) per revolution.

In certain embodiments, the drum encoder rate is programmed into drum encoder 350 as an integer value. For example, drum encoder 350 may be programmed to 1715 or 1716 pulses per revolution. The user may set motor controller 340 to rotate drum 320 at a low speed The low speed may be within a range of five to twenty mph (e.g., 10mph). Image capturing module 140 collects images while drum 320 is rotating at the low speed and communicates the collected images to computer 150. The operator of computer 150 determines (e.g., counts) the number of light or dark pixels in direction Y in one longitudinal pitch distance on target 322. In the illustrated embodiment of FIG. 3. direction Y is perpendicular to axis 360.

The user then sets motor controller 340 to rotate drum 320 at a high speed The high speed may be within a range of fifty to eighty miles per hour (mph) (e.g., 65 mph). The high speed may represent the maximum speed of vehicle 110 of FIG. 1. Image capturing module 140 collects images while drum 320 is rotating at the high speed and communicates the collected images to computer 150. The operator of computer 150 determines (e.g., counts) the number of light or dark pixels in one pitch distance on target 322 in longitudinal direction Y. The high and low speed longitudinal pixel counts are compared to the lateral pixel counts to determine if the camera pixels are representing physical space equally in the lateral and longitudinal directions. If the longitudinal pixel counts are different than the lateral pixel counts, a different drum encoder rate may be programmed into drum encoder 350, and the above process may be repeated to compare the effects of the new drum encoder rate on the pixel counts in the lateral and longitudinal directions.

The drum encoder rate that generates the closest square pixel is then recorded and assigned to image capturing module 140. It the wheel diameter of vehicle 110 of FIG. 1 is known, the vehicle encoder rate for vehicle 110 can then be calculated. The vehicle encoder rate is the number of electrical pulses generated by vehicle encoder 120 in one revolution of the shaft of vehicle encoder 120. The vehicle encoder rate is equal to the wheel circumference of vehicle 110 of FIG. 1 divided by the drum circumference of drum 320 multiplied by the drum encode rate. For example, if the wheel circumference of vehicle 110 is 113.097 inches, the drum circumference of drum 320 is 12.9867 inches, and the drum encoder rate is 32.9867 inches per revolution, the vehicle encoder rate is 133.097 inches divided by 32.9867 inches time 1715 pulses per revolution, which equals 5881 pulses per revolution. A. user may program the vehicle encoder rate into vehicle encoder 120 of system 100 of FIG. 1, which may reduce the time resources required to field calibrate image capturing module 140.

Although FIG. 3 illustrates a particular arrangement of image capturing module 140, computer 150, network 160, fixture 310, drum 320, motor 330, motor controller 340, and drum encoder 350, this disclosure contemplates any suitable arrangement of image capturing module 140, computer 150, network 160, fixture 310, drum 320, motor 330, motor controller 340, and drum encoder 350. For example, motor 330 and motor controller 340 may be a single component. Image capturing module 140, computer 150, fixture 310, drum 320, motor 330, motor controller 340, and drum encoder 350 may be physically or logically co-located with each other in whole or in part.

Although FIG. 3 illustrates a particular number of image capturing modules 140, computers 150, networks 160, fixtures 310, drums 320, motors 330, motor controllers 340, and drum encoders 350, this disclosure contemplates any suitable number of image capturing modules 140, computers 150, networks 160, fixtures 310, drums 320, motors 330, motor controllers 340, drum encoders 350. For example, system 300 may include first computer 150 communicatively coupled to image capturing module 140 and a second computer 150 communicatively coupled to drum encoder 350. One or more components of system 100 may be implemented using one or more components of the computer system of FIG. 6.

FIG. 4 illustrates an example method 400 for field calibrating an image capturing module. Method 400 begins at step 405 At step 410, a camera of an image capturing module (e.g. camera 210 of image capturing module 140 of FIG. 2) captures a first linage of a target (e.g., target 170 of FIG. 1). The image capturing module may be secured to a vehicle (e.g., vehicle 110 of FIG. 1) and the target may be secured to a roadway (e.g., roadway 112 of FIG. 1). The target is perpendicular to the axis of the camera of the image capturing module. Method 400 then moves from step 410 to step 415. The image captured by the camera of the image capturing module may be displayed on a computer (e.g., computer 150 of FIG. 1) communicatively coupled to the image capturing module.

At step 415 of method 400, an operator determines a number of lateral pixels in a lateral pitch distance of the image of the target. For example, the operator may observe the current focus of the camera under constant. lighting conditions. If the contrast between two pixels identifying the boundary of light and dark portions of the focus target is less than observed in bench testing, the operator may unlock the focus mechanism and adjust the focus until a satisfactory result is obtained. The focus mechanism is then locked. The operator may then count the number of light or dark pixels in a lateral pitch distance of the target at the center of the camera's field of view. Method 400 then moves from step 415 to step 420.

At step 420 of method 400, a lateral OPS is determined using the determined number of lateral pixels. For example, the operator may calculate the lateral OPS by dividing the pitch (e.g., one inch) of target. 322 by the number of lateral pixels in the pitch region. Method 400 then moves from step 420 to step 425, where a. vehicle encoder rate is determined based on the lateral OPS. programmed into an encoder (e.g, vehicle encoder 12.0 of FIG. 1) of a. vehicle (e.g., vehicle 110 of FIG. 1), The vehicle encoder rate is equal to the wheel circumference of vehicle 110 of FIG. 1 divided by the lateral OPS. The vehicle encoder has been set to an initial vehicle encoder rate, which was either determined during a bench calibration procedure or determined arbitrarily. If the calculated vehicle encoder rate is different than the initial vehicle encoder rate previously programmed into the vehicle encoder, then the calculated encoder rate is programmed into the vehicle encoder. Method 400 then moves from step 425 step 430.

At step 430, the camera of the image capturing module captures a second image of the target while the vehicle is moved forward or backward over the target. For example, a train operator may move one or more portions of the train (e.g., a locomotive) along the railroad track such that the image capturing module attached to the train passes over a target secured to the railroad track. Method 400 then moves from step 430 to step 435.

At step 435 of method 400, the operator determines a number of longitudinal pixels in one longitudinal pitch distance of the second image of the target. Method 400 then moves from step 440 to step 445, where the operator determines whether the number of lateral pixels in the first image match the number of longitudinal pixels in the second image. If the number of lateral pixels in the first image match the number of longitudinal pixels in the second image method 400 moves from step 440 to step 445, where an operator determines, based on the comparison, that the image capturing module is calibrated.

If, at step 440, the operator determines that the number of lateral pixels in the first image is different than the number of longitudinal pixels in the second image, method 400 moves from step 440 back to step 425, where an operator adjusts the vehicle encoder rate to account for the discrepancy and programs the new vehicle encoder rate into the vehicle encoder. Steps 425 through 400 are repeated until the number of lateral pixels in the first image matches the number of longitudinal pixels in the third image (or the fourth image and so on as required), When the number of lateral and longitudinal pixels match, method 400 moves from step 440 to step 445, where the operator determines, based on the comparison, that the image capturing module is calibrated. Method 400 then moves from step 445 to step 450, where method 400 ends.

Modifications, additions, or omissions may be made to method 400 depicted in FIG. 4. Method 400 may include more, fewer, or other steps. For example, method 400 may include programming the initial vehicle encoder rate into the vehicle encoder. As another example, method 400 may include activating the camera of the image capturing module. Steps may be performed in parallel or in any suitable order. While discussed as specific components completing the steps of method 400, any suitable component may perform any step of method 400.

FIG. 5 illustrates an example method 500 for bench calibrating an image capturing module. Method 500 begins at step 505. At step SIP, a camera of an image capturing module (e.g., camera 210 of image capturing module 140 of FIG. 2), a drum (e.g., drum 320 of FIG. 3), and a motor (e.g., motor 330 of FIG. 3) are attached to a fixture (e.g., fixture 310 of F1G. 3). Method 500 then moves from step 510 to step 515, where a target (e.g., target 322 of FIG. 3) is fastened to the drum. The target is located coaxially and in synchronization with a drum encoder (e. g., drum encoder 350 of FIG. 3). The image capturing module is inst led in the fixture with a fixed working distance between the camera and the target. This working distance is a nominal working distance and may vary slightly between different vehicles that utilize image capturing module 140. Method 500 then move from step 515 to step 520.

At step 520, the camera captures a first image of the target. The camera may be connected to a computer (e.g., computer 150 of FIG. 3) that includes image capturing software. The first image may be an image in the middle of the camera's field of view that is observed h an operator by using the computer. Method 500 then moves from step 520 to step 525, where a number of lateral pixels in a lateral pitch distance oldie image of the target is determined. For example, an operator may count, using the first image displayed on the computer, the number of light or dark pixels in a lateral pitch distance of the target at the center of the camera's field of view. Method 400 then moves from step 525 to step 530.

At step 530 of method 500, a lateral OPS is determined using the determined number of lateral pixels. The lateral OPS is calculated b dividing the pitch (e.g., one inch) of target 322 by the number of lateral pixels in the pitch region. Method 500 then moves from step 530 to step 535, where a drum encoder rate is programmed into a drum encoder (e.g., drum encoder 350 of FIG. 3) of the drum. The drum encoder trite is equal to the circumference of drum 320 divided by the lateral OPS. Method 500 then moves from step 535 to step 540, where the drum encoder rate is programmed into the drum encoder. In certain embodiments, the drum encoder is programmed with an integer value representing the drum encoder rate Method 500 then moves from step 540 to step 545.

At step 545 of method 500, the motor controller is set. to rotate the drum at a low speed (e.g., 10 mph). Method 500 then moves from step 545 to step 550, where the camera of the image capturing module captures one or more images of the target while the drum is rotated at the low speed. Method 500 then moves from step 550 to step 555, where a number of longitudinal pixels in one longitudinal pitch distance of each image is determined For example, each image may be displayed on the computer, and an operator may count the number of dark or light pixels in one pitch distance in the longitudinal section of each image. Method 500 then moves from step 555 to step 560.

At step 560, the motor controller is set to rotate the drum at a high speed e.g., 65 mph). Method 500 then moves from step 560 to step 565, where the camera of the image capturing module captures one or more images of the target while the drum is rotated at the high speed. Method 500 then moves from step 565 to step 570, where a number of longitudinal pixels in one longitudinal pitch distance of each image is captured while the drum is rotating at the high speed is determined. For example, each image may be displayed on the computer, and an operator may count the number of dark or light pixels in one pitch distance in the longitudinal section of each image. Method 500 then moves from step 570 to step 575.

At step 575, the operator determines whether the number of lateral pixels in the first image match the number of longitudinal pixels in the images captured while the drum was rotating at the low and high speeds If the number of lateral pixels in the first image match the number of longitudinal pixels in the low/high speed images, method 500 moves from step 575 to step 580, where the vehicle encoder rate is calculated using the drum encoder rate. The vehicle encoder rate is equal to the wheel circumference of vehicle 110 of FIG. 1 divided by the drum circumference drum 320 of FIG. 3 and then multiplied by the drum encoder rate. Method 500 n moves from step 580 to step 585, where method 500 ends.

If, at step 575, the number of lateral pixels in the first image is different than the number of longitudinal pixels in the low/high speed images, method 500 moves from step 575 back to step 540, where the drum encoder rate is adjusted to account for the discrepancy. The adjusted drum encoder rate is programmed into the drum encoder. Steps 540 through 575 are repeated until the number of lateral pixels in the first image matches the number of longitudinal pixels in the low/high speed images. When the number of lateral and longitudinal pixels match, method 501) moves from step 575 to step 580, where the vehicle encoder rate is calculated using the adjusted drum encoder rate. Method 500 then moves from step 580 to step 585. where method 500 ends.

Modifications, additions, or omissions may be made to method 400 depicted in FIG. 5. Method 500 may include more, fewer, or other steps For example, method 500 may include activating the camera of the image capturing module. Steps may be performed in parallel or in any suitable order. While discussed as specific components completing the steps of method 500, any suitable component may perform any step of method 500. For example, one or more steps of method 500 may be automated (e.g., performed by computer 150 of FIG. 3).

FIG. 6 shows an example computer system that may be used by the systems and methods described herein. For example, one or more components (e g., computer 150) of system 100 of FIG. 1 and/or system 300 of FIG. 3 may include one or more interface(s) 610, processing circuitry 620, memory(ies) 630, and/or other suitable element(s) Interface 610 receives input, sends output, processes the input and/or output, and/or performs other suitable operation. Interface 610 may comprise hardware and/or software.

Processing circuitry 620 performs of manages the operations of the component. Processing circuitry 620 may include hardware and/or software. Examples of a processing circuitry include one or more computers, one or more microprocessors, one or more applications, etc. In certain embodiments, processing circuitry 620 executes logic (e.g., instructions) to perform actions (e.g., operations), such as generating output from input. The logic executed by processing circuitry 620 may be encoded in one or more tangible, non-transitory computer readable media (such as memory 630). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 630 (or memory unit) stores information. Memory 630 may comprise one or more non-transitory, tangible, computer-readable, and/or computer-executable storage media. Examples of memory 630 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer readable non-transitory storage medium or media may include one or more semiconductor-based or other integrated circuits (IC's) (such as field-programmable gate arrays (FPGAs) or application-specific lCs (ASICs)), hard disk drives (HDDs), hybrid hard drives (HHDs), optical discs, optical disc drives (ODDS, magneto-optical discs, magneto-optical drives, floppy diskettes, floppy disk drives (FDD), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several unless expressly indicated otherwise or indicated otherwise by context, Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person haying ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted., arranged, capable, configured, enabled, operable, or operative. Additionally, although this disclosure describes or illustrates particular embodiments as providing particular advantages, particular embodiments may provide none, sonic, or all of these advantages.

What is claimed is:

1. A system for field calibration of an image capture module, comprising:
a vehicle having a beam for orienting components of the system for field calibration while the vehicle is in motion; and
an image capture module operably coupled to the beam, comprising:
a camera configured to capture images of a target disposed proximate railroad tracks; and
a memory configured to store the captured images of the target;
wherein the image capture module is configured to perform the field calibration of the image capture module by:
capturing, via the camera, a first image of a target;
initializing a vehicle encoder operably coupled to the vehicle with a vehicle encoder rate;
adjusting a contrast between two pixels identifying the boundary of light and dark portions of target;
comparing the number of lateral pixels to the number of longitudinal pixels; and
adjusting the vehicle encoder rate until the number of lateral pixels matches the number of longitudinal pixels.

2. The system of claim 1, wherein the target includes a calibration pattern.

3. The system of claim 2, wherein the calibration pattern has a pitch between 0.375 inch and 2.0 inches.

4. The system of claim 2, wherein the calibration pattern includes units with an unequal length-to-width ratio.

5. The system of claim 1, wherein the vehicle encoder rate is a number of electrical pulses generated by vehicle encoder in one revolution of a shaft of the vehicle encoder.

6. The system of claim 1, wherein the contrast is adjusted by unlocking the focus.

7. The system of claim 1, wherein the vehicle encoder is a timing device used to measure axle rotation.

8. The system of claim 1, wherein the vehicle encoder is a rotary encoder.

9. A method for field calibration of an image capture module, comprising:
capturing, via an image capture module operably coupled to a beam of a vehicle, a first image of a target disposed proximate railroad tracks;
initializing a vehicle encoder operably coupled to the vehicle with a vehicle encoder rate;
capturing, via the image capture module, a second image of the target while the vehicle is moved over the target;
receiving image adjustments adjusting a contrast between two pixels to identify the boundary of light and dark portions of target;
comparing the number of lateral pixels to the number of longitudinal pixels; and
adjusting the vehicle encoder rate until the number of lateral pixels matches the number of longitudinal pixels.

10. The method of claim 9, wherein the target includes a calibration pattern.

11. The method of claim 10, wherein the calibration pattern has a pitch between 0.375 inch and 2.0 inches.

12. The method of claim 10, wherein the calibration pattern includes units with an unequal length-to-width ratio.

13. The method of claim 9, wherein the vehicle encoder rate is a number of electrical pulses generated by vehicle encoder in one revolution of a shaft of the vehicle encoder.

14. The method of claim 9, wherein the contrast is adjusted by unlocking the focus.

15. The method of claim 9, wherein image capture module includes a camera configured to capture the images.

16. The method of claim 9, wherein image capture module includes a plurality of cameras configured to capture the images of the target from different angles.

17. A system for calibrating image capturing modules, comprising:
a camera array for acquiring at least one image sequence of each item;
a memory for storing the acquired images and information for each image; and
a processor configured to calibrate image capturing modules by performing the steps of:
capturing, by the camera array, a first image of a target attached to a drum;
determining a number of lateral pixels in a lateral pitch distance of the first image of the target;
determining a lateral object pixel size based on the number of lateral pixels;
determining a drum encoder rate based on the lateral object pixel size, wherein the drum encoder rate is programmed into a drum encoder attached to the drum; and
calculating a vehicle encoder rate based on the drum encoder rate.

18. The system of claim 17, further comprising capturing, by the camera of the image capturing module, a second image of the target while the target is rotated about an axis of the drum.

19. The system of claim 18, further comprising determining a number of longitudinal pixels in a longitudinal pitch distance of the second image.

20. The system of claim 19, further comprising comparing the number of lateral pixels to the number of longitudinal pixels.

21. The system of claim 20, further comprising determining, in response to comparing the number of lateral pixels to the number of longitudinal pixels, that the number of lateral pixels matches the number of longitudinal pixels.

22. The system of claim 21, further comprising programming the vehicle encoder rate into a vehicle encoder attached to a wheel of the vehicle.

23. The system of claim 22, further comprising:
capturing, by the camera of the image capturing module, a third image of the target while the target is rotated about an axis of the drum;
determining a number of longitudinal pixels in a longitudinal pitch distance of the third image; and
comparing the number of lateral pixels to the number of longitudinal pixels in the longitudinal pitch distance of the third image.

* * * * *